US012450154B2

(12) United States Patent
Lien et al.

(10) Patent No.: US 12,450,154 B2
(45) Date of Patent: Oct. 21, 2025

(54) SELECTION OF ERASE POLICY IN A MEMORY DEVICE

(71) Applicant: MICRON TECHNOLOGY, INC., Boise, ID (US)

(72) Inventors: Yu-Chung Lien, San Jose, CA (US); Zhongguang Xu, San Jose, CA (US); Peng Zhang, Los Altos, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/633,288

(22) Filed: Apr. 11, 2024

(65) Prior Publication Data

US 2024/0370364 A1    Nov. 7, 2024

Related U.S. Application Data

(60) Provisional application No. 63/464,315, filed on May 5, 2023.

(51) Int. Cl.
*G06F 12/00* (2006.01)
*G06F 12/02* (2006.01)

(52) U.S. Cl.
CPC .. *G06F 12/0246* (2013.01); *G06F 2212/7205* (2013.01)

(58) Field of Classification Search
CPC ............ G06F 12/0246; G06F 2212/7205
USPC ........................................... 711/103
See application file for complete search history.

(56) References Cited

U.S. PATENT DOCUMENTS

| 2012/0155187 | A1* | 6/2012 | Shelton ............... G11C 16/16 365/185.33 |
| 2015/0186072 | A1* | 7/2015 | Darragh ............ G11C 16/3495 711/103 |
| 2017/0212708 | A1* | 7/2017 | Suhas .................. G06F 3/0679 |
| 2021/0026547 | A1* | 1/2021 | Peh ..................... G06F 3/0604 |
| 2022/0284967 | A1* | 9/2022 | Liikanen ........... G11C 29/4401 |
| 2022/0293626 | A1* | 9/2022 | Xia ....................... G11C 16/08 |

OTHER PUBLICATIONS

AERO: Adaptive Eras Operation for Improving Lifetime and performance of Modern NAND Flash-Based SSDs (Sungjun et al.; Jul. 24, 2004).*

* cited by examiner

*Primary Examiner* — Mardochee Chery
(74) *Attorney, Agent, or Firm* — Lowenstein Sandler LLP

(57) ABSTRACT

A system includes a memory device and a processing device, operatively coupled with the memory device, to perform operations including: identifying a block of the memory device, the block spanning over a plurality of decks; determining whether a set of memory cells of the memory device is disposed in a first deck of the block or a second deck of the block, the first deck having a memory reliability metric satisfying a first criterion pertaining to a reliability of a deck, and the second deck having a memory reliability metric not satisfying the first criterion; selecting, based on the determination, an erase policy for performing an erase operation with respect to the set of memory cells; and causing the erase operation to be performed with respect to the set of memory cells in accordance with the erase policy.

20 Claims, 7 Drawing Sheets ional Patent Application No. 63/464,315, filed May 5, 2023, the entire contents of which are incorporated by reference herein.

SELECTION OF ERASE POLICY IN A MEMORY DEVICE

RELATED APPLICATIONS

This application claims the benefit of U.S. Provisional Patent Application No. 63/464,315, filed May 5, 2023, the entire contents of which are incorporated by reference herein.

TECHNICAL FIELD

Embodiments of the disclosure relate generally to memory sub-systems, and more specifically, relate to adaptive selection of the erase policy for a portion of a memory device, especially a memory device having multiple decks, in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
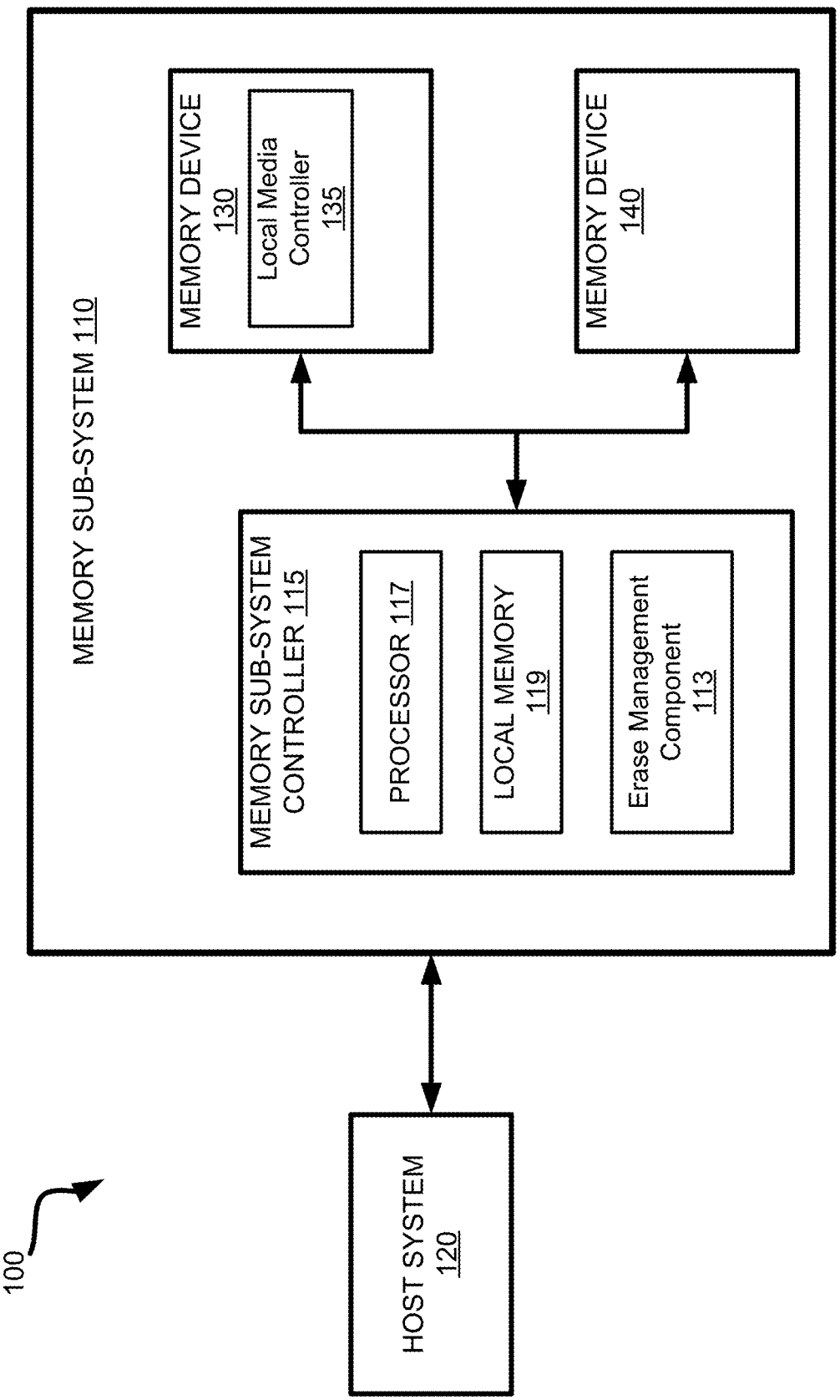
FIG. 1 illustrates an example computing system that includes a memory sub-system, in accordance with some embodiments of the present disclosure.

Aspects of the present disclosure are directed to adaptive selection of the erase policy for a portion of a memory device, especially a memory device having multiple decks, in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information and has various logic states that correlate to the number of bits being stored. The logic states can be represented by binary values, such as "0" and "1", or combinations of such values.

A memory device can include multiple memory cells arranged in a two-dimensional or three-dimensional grid. Memory cells are formed onto a silicon wafer in an array of columns and rows. A memory device can further include conductive lines connected to respective ones of the memory cells, referred to as wordlines and bitlines. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

A memory cell ("cell") can be programmed (written to) by applying a certain voltage to the cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual cell (having a charge Q stored thereon) there can be a threshold control gate voltage $V_T$ (also referred to as the "threshold voltage") such that the source-drain electric current is low for the control gate voltage ($V_{CG}$) being below the threshold voltage, $V_{CG} < V_T$. The current increases substantially once the control gate voltage has exceeded the threshold voltage, $V_{CG} > V_T$. Because the actual geometry of the electrodes and gates varies from cell to cell, the threshold voltages can be different even for cells implemented on the same die. The cells can, therefore, be characterized by a distribution P of the threshold voltages, $P(Q, V_T) = dW/dV_T$, where dW represents the probability that any given cell has its threshold voltage within the interval $[V_T, V_T + dV_T]$ when charge Q is placed on the cell.

A memory device can exhibit threshold voltage distributions $P(Q, V_T)$ that are narrow compared with the working range of control voltages tolerated by the cells of the device. Accordingly, multiple non-overlapping distributions $P(Q_k, V_T)$ can be fit into the working range allowing for storage and reliable detection of multiple values of the charge $Q_k$, k=1, 2, 3 .... The distributions are interspersed with voltage intervals ("valley margins") where none (or very few) of the cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device. A valley margin can also be referred to as a read window. Read window budget (RWB) refers to the total value of the read windows over all logical states.

One type of cell is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits. A memory device can include one or more arrays of memory cells such as SLCs, MLCs, TLCs, QLCS, PLCs, etc. or any combination of such. For example, a memory device can include an SLC portion, and an MLC portion, a TLC portion, a QLC portion, or a PLC portion of cells.

Some memory devices, such as three-dimensional (3D) cross-point devices, can include multiple decks represented by respective two-dimensional (2D) arrays of memory cells electronically addressable by a vertical access line(s) (e.g., wordline(s)). Multiple decks can be stacked within a memory device (e.g., stacked vertically). Certain memory devices are divided into multiple decks to mitigate the performance and reliability penalties. For example, as a desire for increased storage capacity in memory devices drives an expansion of block sizes, including an increase of the number of wordlines in each block, the presence of such additional wordlines, however, presents certain challenges including, for example, performance and reliability penalties attributable to various inefficiencies (e.g., associated with garbage collection or other media management operations for the increased block size). As such, a memory device could include a top (or "upper") deck and a bottom (or "lower") deck, each including a respective set of wordlines from the memory device. The separate decks are individually accessible, such that a memory access operation (i.e., a program, read, or erase operation) could be performed on one deck without impacting memory cells of the other deck. As such, the granularity of memory device becomes smaller to the granularity of deck.

For example, if a block including two decks is used in a memory device, and the granularity of the block becomes a half under this scenario, which can be considered as "block by deck" scenario. "Block by deck" block refers to a block spanning over two or more decks, such that each part of the block residing in a corresponding deck can be erased and programmed independently, thus benefiting in cost reduction, per zone bandwidth gain, and write amplification reduction. In some cases, the decks in the block-by-deck scenario can be designated for different predefined usages.

As the number of wordlines in a deck increases, the likelihood of defects in the wordlines increase. The defects may include wordline-to-wordline short, and/or open wordline. For example, open wordline indicates that a void occurs during cycling degradation and voltage signals cannot be achieved from the row decoder. This defect can occur at wordline plane, staircase connection or anywhere along the signal path. As another example, an electrical short can develop between two adjacent wordlines, and when a certain voltage, such as a program voltage, is applied to one of those wordlines, a current is developed, at least a portion of which can flow through the electrical short and onto the adjacent wordline. This portion of the current can be referred to as a "leakage current" and the electrical short can be referred to as a "wordline-to-wordline short." This leakage current can impact the logical values programmed to or read from the memory cells connected to the associated wordlines leading to errors on the memory device. For example, a wordline-to-wordline short can cause a current (e.g., during a write operation applied to the selected wordline) to discharge some electrons to the wordline adjacent to the wordline being programmed. This results in the write operation failing to program data on the selected wordline, as well as the data on the adjacent wordline being corrupted.

Therefore, in some cases, some decks of the memory device may have the defect that makes the decks unusable, while other decks of the memory device can still function well. For example, in a memory device that has two decks, one or more defective wordlines in one deck may make the deck unusable ("defective"), while the other deck still can be used to store data and can be deemed as useful ("functional"). Such a partially usable memory device may be put in use by having the defective deck in an erase state. A partially usable memory device can be a memory device (or any unit of the memory device) having at least one functional deck and at least one defective deck. It is better to maintain the defective deck in an erase state, because it would have the least effect on the threshold voltage distribution of the other functional deck. For example, if the defective deck is an upper deck in a two-deck memory device, the upper deck will be kept in the erase state and the bottom deck will be used as normal. Thus, there is a corresponding erase scheme for the partially usable memory device, for example, so that the defective deck will not be re-erased, as re-erasing can affect the threshold voltage distribution of the other functional deck. For example, the erase scheme to be applied to a functional deck may include a preprogram operation before applying the erase pulse to make the cells voltage more uniform after applying the erase pulse. The preprogram operation will apply a program pulse to all wordlines on the functional deck. On the defective deck, the erase scheme will not have the preprogram operation applied as well as the erase pulse.

When there is an insufficient delay between erasing a portion of a memory device and subsequently programming the portion, residual holes can remain trapped in the semiconductor substrate of the portion. Subsequent programming of the portion with the trapped residual holes can result in an inhibited threshold voltage across the portion. The number of residual holes trapped in the semiconductor substrate can depend on a pre-erase data pattern and memory cell characteristic. As a result, some cells can have a larger upshift of the threshold voltage distribution than other cells, making the threshold voltage distribution width wider, and thus decrease the available RWB. In some implementations, this effect has been compensated for by allowing time after the erase operation for the residual holes to de-trap before programming the portion, and thus improve reliability of the portion. In some implementations, various erase policies can provide different time after the erase operation before programming. However, these erase policies are applied to normal usage scenarios and there is no special treatment on these erase policies for the "block by deck" memory device and the partially usable memory device. For example, time after the erase operation before programming used for normal memory device is applied to all "block-by-deck" memory device as well as partially usable memory device. It can result in more shift in the threshold voltage distribution and, in turn, increase the error rate (e.g., raw bit error rate (RBER)).

Aspects of the present disclosure address the above and other deficiencies by applying adaptively selected erase policies to a set of memory cells of a memory device for reliability gain. More specifically, in embodiments described herein, a memory sub-system controller can identify an erase policy that should be applied to the set of memory cells of memory device, given a memory reliability metric (e.g., RWB) of the set of memory cells. In some implementations, the memory reliability metric may correspond to the relative positions of set of memory cells in the memory device. Therefore, the present disclosure provides a finer granularity of memory devices on erase policies.

In some embodiments, the controller can identify or receive a memory reliability metric (e.g., RWB) associated with a set of memory cells, select an erase policy for the set of memory cells based on the memory reliability metric, and cause an erase operation to be performed on the set of memory cells in accordance with the erase policy.

In some embodiments, a set of memory cells of the memory device is labelled with a pre-characterized value of a memory reliability metric (e.g., RWB), the controller can identify the set of memory cells for erase policy selection, select an erase policy for the set of memory cells based on the memory reliability metric, and cause an erase operation to be performed on the set of memory cells in accordance with the erase policy.

For example, a memory sub-system controller can receive a request to perform a program operation on a set of memory cells of a memory device. The memory sub-system controller can determine whether the memory device in which the set of memory cells is disposed includes at least two block-by-deck decks or both defective and functional decks. In response to determining that the memory device in which the set of memory cells is disposed is a memory device including at least two block-by-deck decks or including both defective and functional decks, the memory sub-system controller can determine to use the erase policy selecting scheme to adaptively select the erase policy for the set of memory cells.

For example, a block of the memory device according to the present disclosure can span over at least two decks. The two decks can include two block-by-deck (BBD) decks or include a functional deck and a defective deck. A BBD deck refers to a deck that can be individually accessible, such that a memory access operation (i.e., a program, read, or erase operation) could be performed on one deck without impacting memory cells of the other deck. A functional deck refers to a deck that satisfies a criterion pertaining to a functionality of a deck, for example, a metric of the deck (e.g., an average RBER) does not exceed a threshold value that is considered as an indication of a functionality normality of the deck. A defective deck refers to a deck that does not satisfy a criterion pertaining to a functionality of a deck, for example, a metric of the deck (e.g., an average RBER) exceeds a threshold value that is considered as an indication of a functionality normality of the deck. The criteria used for the functional deck can be the same as or different from the criteria used for the defective deck. In some implementations, a defective deck may be identified by program status failure. For example, either voltages applied in the program phase reaches the max voltage setting (e.g., pre-defined value), or program loops hit the max loops setting (e.g., pre-defined values).

In some implementations, a block can be a normal block or a BBD block. A normal block refers to a block without using the block-by-deck technique. A BBD block refers to a block formed by two or more BBD decks, where each BBD deck is independently accessible and functional.

In some implementations, a block can be a normal block with defective and functional decks. A normal block with defective and functional decks refers to a block that has at least one functional deck and at least one defective deck, and for easy description, the normal block with defective and functional decks is referred to as a partial good block (PGB). A partial good block (PGB) can be a type-I PGB (PGB1) or a type-II PGB (PGB2). PGB1 refers to a PGB where at least one defective deck would be programmed after at least one functional deck being programmed, that is, in most cases, where at least one defective deck is physically disposed below at least one functional deck (with respect to a direction perpendicular to a bottom wafer of the memory device). PGB2 refers to a PGB where any defective deck would be not programmed after any functional deck being programmed, that is, in most cases, where there is no defective deck physically disposed below any functional deck. For example, for a two-deck block, PGB1 represents a functional deck physically disposed above a defective deck (F-D) block; PGB2 represents a defective deck physically disposed above a functional deck (D-F) block, where "F" stands for a functional deck, "D" stands for a defective deck, and "-" stands for (its left-side item) being physically disposed above (its right-side item). For a three-deck block, PGB1 represents a D-F-D block, a F-D-D block, a F-D-F block, or a F-F-D block; and PGB2 represents a D-D-F block or a D-F-F block.

To select the erase policy for the set of memory cells, the memory sub-system controller can determine whether the set of memory cells is disposed in a segment (e.g., a deck) corresponding to a poor reliability indicated by the memory reliability metric (e.g., low RWB referring to a RWB below a predetermined threshold value) or corresponding to a good reliability indicated by the memory reliability metric (e.g., high RWB referring to a RWB above a predetermined threshold value). To simplify the description below, a deck with low RWB ("low-RWB deck") will be used as an example of the segment corresponding to a poor reliability indicated by the memory reliability metric, and a deck with high RWB ("high-RWB deck") will be used to as an example of the segment corresponding to a good reliability indicated by the memory reliability metric. The memory reliability metric of a memory unit refers to a metric representing a reliability of the memory unit, including RWB.

In some implementations, the controller can identify or receive the memory reliability metric associated with each deck of the BBD block and characterize an upper deck of the BBD block as a high-RWB deck and characterize a lower deck of the BBD block as a low-RWB deck. In some implementations, an upper deck of the BBD block can be pre-characterized (e.g., characterized during the development and manufacturing of the memory device) as a high-RWB deck, a lower deck of the BBD block can be pre-characterized (e.g., characterized during the development and manufacturing of the memory device) as a low-RWB deck, and the controller can access the pre-characterized information. The memory sub-system controller can determine whether the set of memory cells is disposed in an upper deck of the BBD or a lower deck of the BBD block to determine whether the set of memory cells is disposed in a high-RWB deck or a low-RWB deck.

In some implementations, the controller can determine the value of the memory reliability metric associated with each deck of the PGB block and characterize a functional block of PGB1 as a high-RWB deck and characterize a functional block of PGB2 as a low-RWB deck. In some implementations, a functional block of PGB1 can be characterized as a high-RWB deck, and a functional block of PGB2 can be characterized as a low-RWB deck. The memory sub-system controller can determine, for example, based on the address of the set of memory cells, whether the set of memory cells is disposed in a functional block of PGB1 or a functional block of PGB2 to determine whether the set of memory cells is disposed in a high-RWB deck or a low-RWB deck.

Responsive to determining that the set of memory cells is disposed in a low-RWB deck, the memory sub-system controller can select an erase policy with long-delay or non-zero-delay (e.g., "just-in-time" (JiT) erase policy, "erase in advance" (EIA) erase policy), and cause an erase operation to be performed on the set of memory cells in accordance with the selected erase policy.

Responsive to determining that the set of memory cells is disposed in a high-RWB deck, the memory sub-system controller can select an erase policy with short-delay or zero-delay (e.g., "erase on demand" (EOD) erase policy), and cause an erase operation to be performed on the set of memory cells in accordance with the selected erase policy.

The various erase policies, including non-zero-delay and zero-delay erase policies, are described below in detail. In some systems, a segment can be designated to be erased before being programmed (e.g., a segment storing data can be erased and then programmed with new data). During the erase operation, relatively high voltages can be applied to the wordline during a pre-program phase of the erase operation, and relatively high voltages can be applied to the channel while applying an erase voltage. For example, some implementations of an erase operation can include applying an initial pre-programming pulse to wordlines of the segment to reset memory cells with a lower threshold voltage. During the erase operation, electrons can be removed, and holes can be injected into the selected wordline (e.g., holes can form in the channel or charge trap layer, allowing electrons to flow into the channel). For example, injected holes can be trapped in storage nitride of array transistors connected to the wordlines that have been erased. Since the channel region (e.g., the pillar) in some non-volitive memory devices is a floating channel that might not be connected to a bulk grounded body, it can take a certain amount of time before the residue holes are discharged. Accordingly, these holes can contribute to program disturb in a number of ways.

In some implementations, some methods for programming a segment include performing an erase operation and immediately performing a programming operation. This method can apply an erase policy that can be referred to as zero-delay erase policy (e.g., where "zero-delay" refers to no programmed or pre-determined delay, not necessarily that there will be practically "zero delay" between an erase operation and subsequent program operation). One example of a zero-delay erase policy is an "erase on demand" (EOD) erase policy. However, performing the programming operation immediately following the erase operation can cause residual holes to remain trapped during the programming process. Accordingly, the residual holes might not discharge until after the programming operation is completed, and memory cells programmed to lower threshold voltages or logic states can experience the most programming disturbances. When the residual holes discharge during or after the programming operation, a threshold voltage of memory cells can shift (e.g., the voltage threshold of the memory cells can increase after the residue holes are discharged). This can impact read margins and can cause the contents of the memory cell to be read as a data value different than the intended value stored during the application of the programming voltage.

In some implementations, some methods for programming a segment include performing an erase operation and then, after a delay, performing a programming operation. This method can be referred to as a non-zero delay erase policy (e.g., where "non-zero delay" refers to a programmed or pre-determined delay that is added between an erase operation and subsequent program operation). One example of a non-zero delay erase policy is a "just-in-time" (JiT) erase policy. In a JiT erase policy, erased segments are randomly selected to be programmed (e.g., the time between an erase operation and a program operation for a given segment is random). Another example of a non-zero delay erase policy is an "erase in advance" (EIA) erase policy. In an EIA erase policy, erased segments can be systematically selected to be programmed (e.g., the time between an erase operation and a program operation for a given segment is roughly similar to other segments) with a first-in-first out (FIFO) selection process (e.g., the segments which have been erased for the longest time are the segments which are programmed first). An EIA erase policy can guarantee a minimum amount of time between an erase operation and a subsequent programming operation with respect to each segment, whereas there is no such minimum in a JiT erase policy (due to the random selection operation in a JiT erase policy). Thus, an EIA erase policy can generally provide a more consistent set of segments to be programmed than a JiT erase policy, therefore providing improved reliability. The delay between the erase operation and the programming operation (referred to as "erase retention time") can be used to reduce voltage threshold shift that otherwise can be introduced due to the number of residual holes still trapped in the wordline or channel after the erase operation concludes.

In some implementations, when a first deck (e.g., a lower deck) occupied by the block has been erased (e.g., according to a zero-delay erase policy) but there is not enough erase retention time for RWB gain for the first deck (e.g., because of the zero-delay erase policy) and then a large amount of host data comes in, the controller can prioritize to use a second deck (e.g., an upper deck) from a block pool of the non-zero-delay erase policy, which gives the first deck time for preparing for programming. In some implementations, when a first deck (e.g., a lower deck) occupied by the block has been erased (e.g., according to a non-zero-delay erase policy) and there is enough erase retention time for RWB gain for the first deck (e.g., because of the non-zero-delay erase policy) and then a large amount of host data comes in, the controller can use the first deck or any decks from a block pool of the non-zero-delay erase policy. In some implementations, the controller keeps a block pool for different decks in a memory sub-system to improve the flexibility of the block usage while providing a sustainable erase retention time for each deck in the memory sub-system.

Further details regarding implementing adaptively selecting an erase policy in a memory device having block-by-deck decks or having both defective and functional decks in a memory sub-system are described herein below with reference to FIGS. 1-7. Although the deck is illustrated as a management unit of the memory device that the present disclosure applies on, any other management unit of the memory cell can be also appliable as long as each management unit corresponds to a reliability indicated by the memory reliability metric, for example, edge blocks and non-edge blocks. For each deck or other management unit of the memory cell, the selection of the erase policy can be independent.

Advantages of the present disclosure include, but are not limited to, improved memory device performance and reliability. Implementing adaptively selected erase policy can provide a balance between the trade-off of different erase policies. For example, implementing adaptively selected erase policy may reduce the penalty associated with the number of valid blocks (e.g., the penalty in an EIA erase policy) or associated with the performance of the memory (e.g., the penalty in an EOD erase policy). The adaptively selected erase policy may improve the RWB (e.g., the advantage from the EIA erase policy) or save the memory cost (e.g., the advantage from the EOD erase policy). Specifically, the reliability in a memory device that has block-by-deck decks or has both defective and functional decks can be improved without affecting much on the cost. The present disclosure gives a finer granularity of memory device regarding selecting and implementing the erase policy.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCS, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processors.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes an erase management component 113 that can be used to implement adaptive selection of erase policies for portions (e.g., decks) of a memory device, in accordance with embodiments of the present disclosure. In some embodiments, the memory sub-system controller 115 includes at least a portion of the erase management component 113. In some embodiments, the erase management component 113 is part of the host system 110, an application, or an operating system. In other embodiments, local media controller 135 includes at least a portion of erase management component 113 and is configured to perform the functionality described herein. Further details regarding the operations of the erase management component 113 will be described below with reference to FIGS. 2-7.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Figure 2:
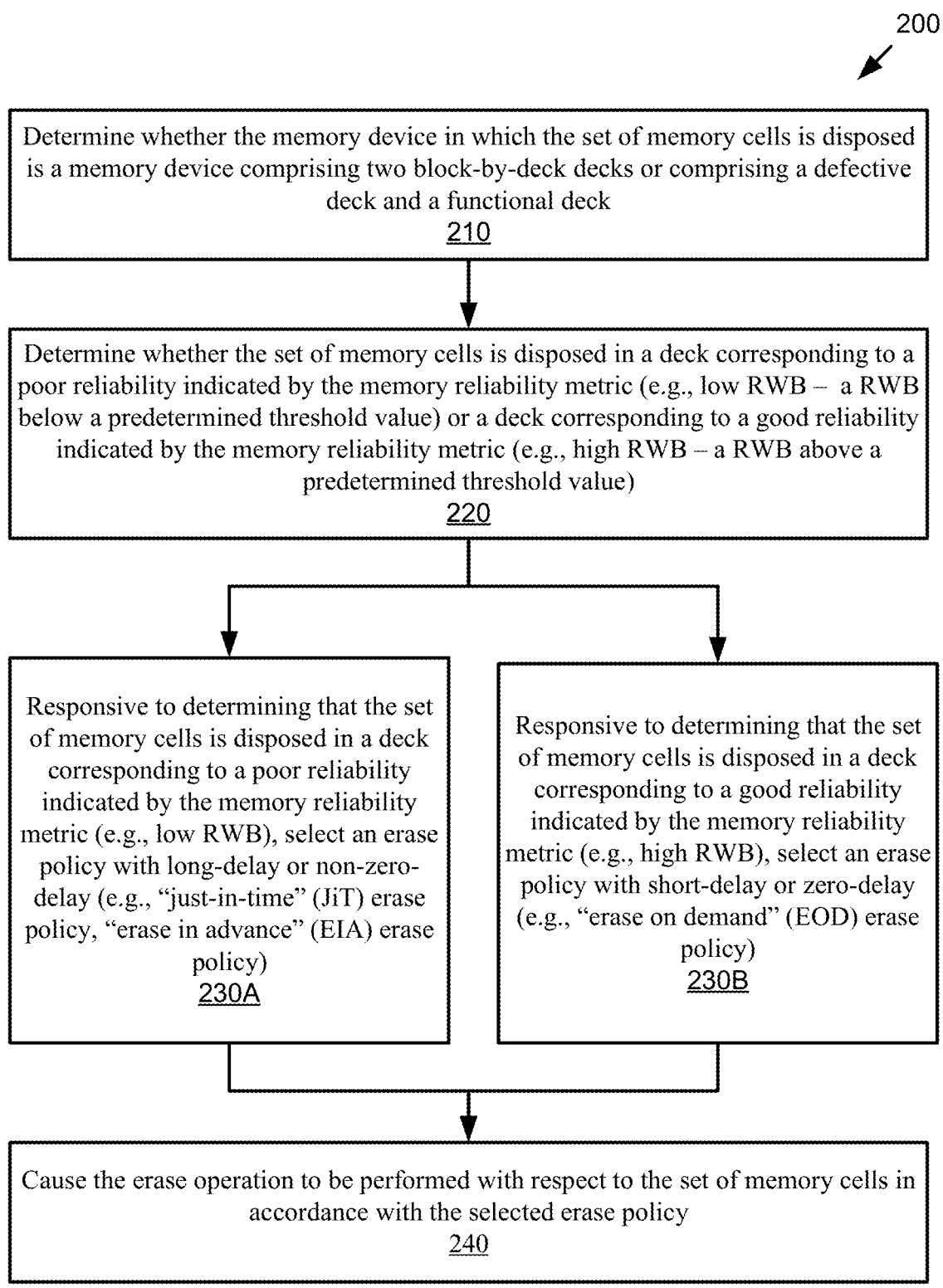
FIG. 2 illustrates a flow diagram of an example of method to implement adaptive selection of the erase policy for a portion of a memory device having multiple decks, in accordance with some embodiments of the present disclosure.

FIG. 2 is a flow diagram of an example method 200 to implement adaptive selection of erase policies, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the erase management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some implementations, the processing logic receives a request to perform a program operation on a set of memory cells in a portion of a memory device, such as memory device 130 of FIG. 1. In some embodiments, the request for a program operation can be received at a memory sub-system controller (e.g., the memory sub-system controller 115 of FIG. 1) from a host device (e.g., the host system 120 of FIG. 1). In some implementations, the set of memory cells is disposed in a block that comprises one or more decks. In the method 200, the block can be replaced by any unit of the memory device that includes one or more decks.

In some implementations, the processing logic can select the erase policy associated with the set of memory cells to predetermine or modify the erase policy such that when the processing logic receives the request to perform a program operation on the set of memory cells, the processing logic can use the selected erase policy for the program operation on the set of memory cells. The selection of erase policy associated with the set of memory cells are described below.

At operation 210, the processing logic determines whether the memory device in which the set of memory cells is disposed is a memory device comprising at least two block-by-deck (BBD) decks or comprising at least one defective deck and at least one functional deck. The BBD deck is individually accessible, such that a memory access operation (i.e., a program, read, or erase operation) could be performed on one BBD deck without impacting memory cells of the other BBD deck. The at least one functional deck satisfies a first criterion pertaining to a functionality of a deck, and the at least one defective deck of the plurality of decks does not satisfy the first criterion.

In some implementations, the processing logic determines whether the set of memory cells is disposed in a BBD block. As described previously, the BBD block refers to a block formed by two or more BBD decks, where each BBD deck is independently accessible and functional. In some implementations, a data structure may include metadata (e.g., a flag) indicating whether the set of memory cells is associated with a BBD block. In some implementations, the processing logic may, based on identifying a physical and/or logical address of the set of the memory cells, to determine whether the set of the memory cells is disposed in a BBD block.

In some implementations, the processing logic determines whether the set of memory cells is disposed in a PGB. As described previously, PGB represents a block comprising at least one functional deck and at least one defective deck, and the functional deck satisfies a first criterion pertaining to a functionality of a deck and the defective deck does not satisfy a second criterion pertaining to a functionality of a deck. The first criterion and the second criterion can be the same or different. For example, satisfying the first criterion may require that all or a certain number or percentage (e.g., 90%) of wordlines within the deck can be programmed and read within an error rate below a first threshold value, and not satisfying the second criterion may require that all or a certain number or percentage (e.g., 50%) of wordlines within the deck cannot be properly programmed or can be read only with an error rate exceeding a second threshold value. In some implementations, each of the first criterion and the second criterion may vary based on the usage of the deck. For example, when a higher error rate is tolerable for a certain usage, the threshold value may be higher.

In some implementations, the processing logic may, by identifying a physical and/or logical address of the set of the memory cells, determine whether the set of the memory cells is disposed in a block that has at least one first deck that satisfies a criterion pertaining to a functionality of a deck and at least one second deck that does not satisfy the criterion.

For example, the processing logic can identify the logical address of the set of memory cells, for example, corresponding to a wordline. The processing logic can use a data structure, such as a mapping table, to identify a deck (and/or a block which the deck is disposed in) to which the wordline is mapped based on the address of the wordline. The data structure can list each wordline of the memory device in an entry and can list a corresponding deck (and/or a corresponding block) of the memory device on which the wordline is disposed in an associated (e.g., linked) entry. The data structure can list each deck of the memory device in an entry and can list a corresponding block of the memory device on which the deck is disposed in an associated (e.g., linked) entry. In some embodiments, the data structure can be preconfigured at manufacturing of the memory device. In some embodiments, the data structure can be stored on the memory device.

Then, the processing logic can determine whether the block (in which the deck is disposed) is a block that has at least one functional deck that satisfies a criterion pertaining to a functionality of a deck and at least one defective deck that does not satisfy the criterion. The processing logic can use another data structure to check an indicator that represents the block has at least one functional deck that satisfies a criterion pertaining to a functionality of a deck and at least one defective deck that does not satisfy the criterion (or an indicator that represents the block is an PGB). In some embodiments, the data structure for indicating can list each block of the memory device in an entry and can list in an associated entry an indicator (e.g., a bit flag) that the block has at least one functional deck that satisfies a criterion pertaining to a functionality of a deck and at least one defective deck that does not satisfy the criterion (or an indicator that represents the block is an PGB). In some embodiments, the data structure can be preconfigured at manufacturing of the memory device and modified during the usage of the memory device. In some embodiments, this data structure be determined during the lifetime usage of the memory device based on online testing and media characterization of the memory device under various testing conditions.

As the purpose of operation 210 is to determine whether to use a method of selecting the erase policy according to memory reliability metric to modify the current (e.g., default) erase policy, in some implementations, at operation 210, the processing device may determine whether to active or enable the method of selecting the erase policy according to indications related to memory reliability metric (e.g., difference among the memory reliability metric for different decks exceeding a threshold value). In some implementations, the processing device may identify a block of the memory device, the block spanning over a plurality of decks, the decks comprising at least two block-by-deck decks or comprising at least one defective deck and at least one functional deck, wherein the at least one functional deck satisfies a first criterion pertaining to a functionality of a deck, and the at least one defective deck of the plurality of decks does not satisfy the first criterion.

At operation 220, responsive to determining that the memory device in which the set of memory cells is disposed is a memory device comprising two block-by-deck decks or comprising a defective deck and a functional deck, the processing logic determines whether the set of memory cells is disposed in a deck corresponding to a poor reliability indicated by the memory reliability metric (e.g., low RWB-a RWB below a predetermined threshold value) or a deck corresponding to a good reliability indicated by the memory reliability metric (e.g., high RWB-a RWB above a predetermined threshold value). In some implementations, the processing device may determine whether the set of memory cells is disposed in a first deck of the block or a second deck of the block, the first deck having a memory reliability metric satisfying a second criterion pertaining to a reliability of a deck, and the second deck having a memory reliability metric not satisfying the second criterion.

In some implementations, the processing logic determines a deck corresponding to a reliability indicated by the memory reliability metric according to a data structure. For example, the data structure can list each deck of the memory device in an entry, and each entry includes a deck identifier and a corresponding memory reliability metric. As another example, the data structure can list each deck of the memory device in an entry, and each entry includes a deck identifier and a corresponding indicator (e.g., a bit flag) with respect to a memory reliability metric, where the indicator indicates whether the deck has a poor reliability or a good reliability. As yet another example, the data structure can list each deck of the memory device in an entry, and each entry includes a deck identifier and a corresponding multi-level indicator (e.g., a bit value) with respect to a memory reliability metric, where the multi-level indicator indicates a level of multiple levels of reliability of the deck. In some implementations, the data structure can be preconfigured at manufacturing of the memory device and modified during the usage of the memory device. In some implementations, the data structure can be stored on the memory device.

In some implementations, the processing logic can identify the relative positions of the decks based on the physical addresses of the decks, and use the relative positions of the decks to determine whether the block corresponding to a poor reliability or a good reliability. In some implementations, the block is a BBD block, the processing logic can identify an upper deck of the BBD block as corresponding to a good reliability, and identify a lower deck of the BBD block as corresponding to a poor reliability. In some implementations, the block is a PGB1 block, the processing logic can identify an upper block that is a functional block of PGB1 as corresponding to a good reliability. In some implementations, the block is a PGB2 block, the processing logic can identify a lower block that is a functional block of PGB2 as corresponding to a poor reliability.

As the purpose of operation 220 is to identify a deck based on the value of the corresponding memory reliability metric, in some implementations, at operation 220, the processing device may determine the value of the memory reliability metric associated with the set of memory cells according to a data structure, and the data structure can list each set of the memory cells in an entry, and each entry includes a physical or logical address of the set of the memory cells and a corresponding value of memory reliability metric. In some embodiments, the data structure can be preconfigured at manufacturing of the memory device and modified during the usage of the memory device. In some embodiments, the data structure can be stored on the memory device.

Although the deck is described in operation 220, other management unit, such as a block, is also applicable. For example, a block at the edge of a memory device may correspond to a poor reliability indicated by the memory reliability metric (e.g., low RWB-a RWB below a predetermined threshold value), and a block not at the edge of a memory device may correspond to a good reliability indicated by the memory reliability metric (e.g., high RWB-a RWB above a predetermined threshold value).

At operation 230A, responsive to determining that that the set of memory cells is disposed in a deck corresponding to a poor reliability indicated by the memory reliability metric (e.g., low RWB), the processing logic selects an erase policy with long-delay or non-zero-delay (e.g., "just-in-time" (JiT) erase policy, "erase in advance" (EIA) erase policy). At operation 230B, responsive to determining that the set of memory cells is disposed in a deck corresponding to a good reliability indicated by the memory reliability metric (e.g., high RWB), the processing logic selects an erase policy with short-delay or zero-delay (e.g., "erase on demand" (EOD) erase policy). That is, at operations 230A and 230B, the processing device can select, based on the determination in operation 220, an erase policy for performing an erase operation with respect to the set of memory cells.

Figure 3:
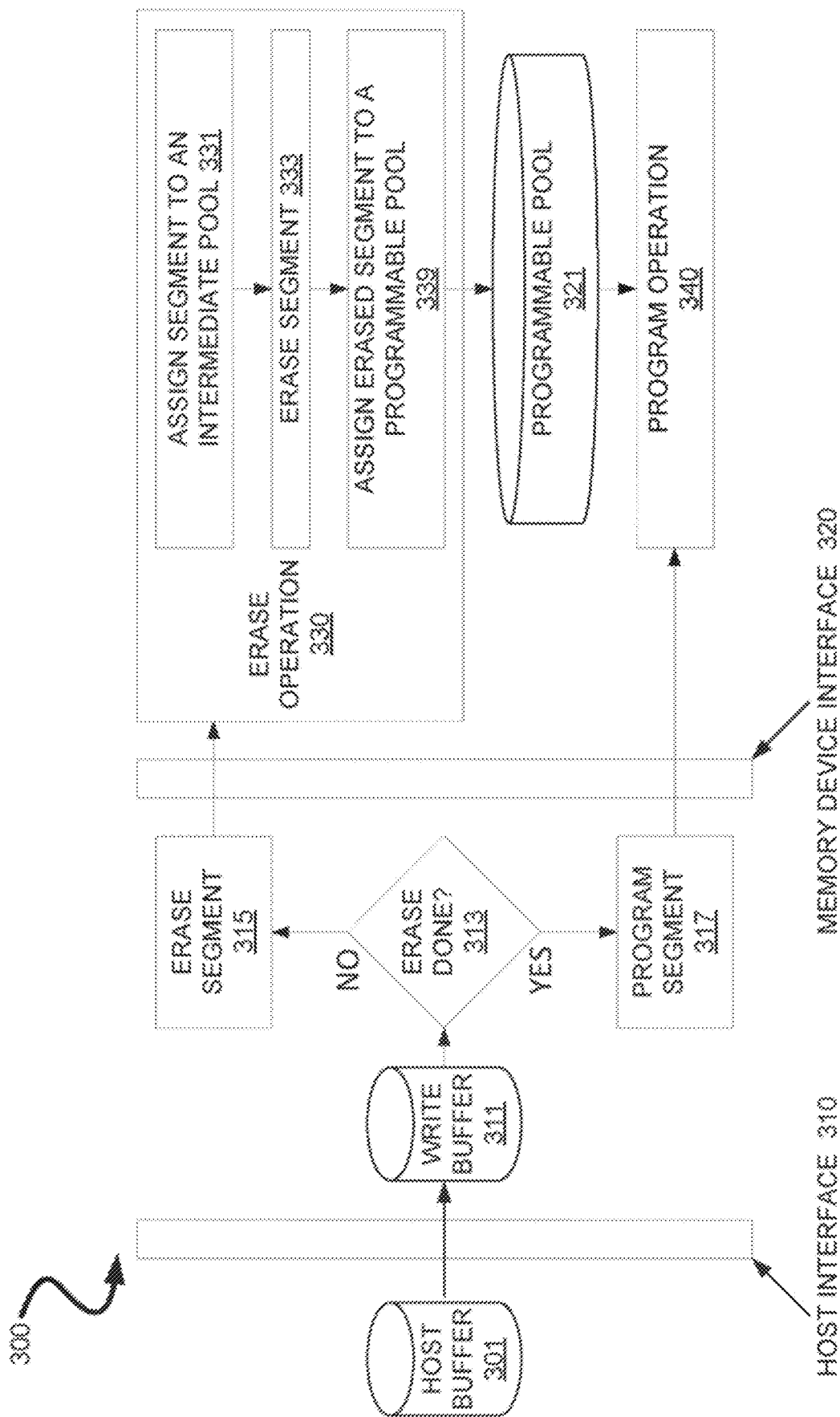
FIG. 3 illustrates a diagram of an example system for implementing a zero-delay erase policy, in accordance with some embodiments of the present disclosure.

The erase policy with short-delay or zero-delay (e.g., "erase on demand" (EOD) erase policy) provides a relatively short erase retention time, and an example of the EOD erase policy is illustrated with respect to FIG. 3. The erase policy with long-delay or non-zero-delay (e.g., "just-in-time" (JiT) erase policy, "erase in advance" (EIA) erase policy) provide a relatively long erase retention time, an example of the JiT erase policy is illustrated with respect to FIG. 4, and an example of the EIA erase policy is illustrated with respect to FIG. 5.

At operation 240, the processing logic can cause the erase operation to be performed with respect to the set of memory cells in accordance with the erase policy. To perform the program operation on the set of cells, the processing logic can initiate the program operation by performing the selected erase policy. As such, the adaptive selection of the erase policy can provide an adaptive erase retention time for the purpose of compensating the poor reliability of decks for various scenario, including the "block-by-deck" memory devices and the partially useful memory devices.

FIG. 3 illustrates a diagram of an example system 300 for implementing a zero-delay erase policy, in accordance with some embodiments of the present disclosure. For example, the system 300 can implement an EOD erase policy. In some embodiments, system 300 can be included within a computing system, such the computing system 100 as described above with respect to FIG. 1. In some embodiments, system 300 can apply a zero-delay erase policy adaptively selected in accordance with method 200 as described above with respect to FIG. 2.

The system 300 includes a host buffer 301 of a host system (e.g., the host system 120 of FIG. 1) and a buffer 311 of a memory sub-system (e.g., the memory sub-system 110 of FIG. 1). Write buffer 311 stores write requests received from host buffer 301. A memory sub-system controller (e.g., memory sub-system controller 115 of FIG. 1) determines whether an erase with respect to a segment of a memory device (e.g., the memory device 130 of FIG. 1) is done at operation 313. If the erase is determined to not be done, the memory sub-system controller can send, via a memory device interface 320, an erase segment command to erase the segment at operation 315. More specifically, the erase segment command can be a command to initiate or continue an erase operation 330 to erase the segment. If the erase is determined to be done, then the memory sub-system controller can send, via the memory device interface 320, a program segment command to program the segment at operation 317. More specifically, the program segment command can be a command to initiate or continue a program operation to program to the segment). In some embodiments, operations 315 and 317 can be performed serially.

A local media controller (e.g., the local media controller 135 of FIG. 1) can receive the erase segment command to perform the erase operation 330 and/or the program segment command to perform the program operation 340. To perform the erase operation 330, the local media controller can select the segment to erase. To perform the program operation 340, the local media controller can select a segment to program. In some embodiments, the erase operation 330 can prepare the segment to be programmed with new data during the program operation 340.

Erase operation 330 can include sub-operations, such as sub-operations 331, 333, and 339 shown here. At sub-operation 331, the local media controller assigns the segment to an intermediate pool. In some embodiments, the intermediate pool can be a garbage pool. The assignment of the segment to the garbage pool can signify that the segment can be programmed. In some embodiments, assigning the segment to the intermediate pool can include reassigning the segment from the garbage pool to another intermediate pool. In some embodiments, the local media controller can assign a segment to two or more intermediate pools before the segment can be programmed.

At sub-operation 333, the local media controller erases the segment to obtain an erased segment. In some embodiments, the segment can be erased by setting the cells in the segment to an erase voltage level or set of erase voltage levels. In some embodiments, the local media controller can assign an erase voltage as a "high" voltage for the cells in the segment. In some embodiments, the local media controller can erase a segment by assigning the segment to an intermediate pool (e.g., the intermediate pool of 331).

At sub-operation 339, the local media controller assigns the erased segment to programmable pool 321. In some embodiments, the local media controller can assign erased segments to programmable pool 321 in order (e.g., first-in first-out (FIFO)). In some embodiments, the local media controller can randomly assign erased segments to programmable pool 321. In some embodiments, programmable pool 321 includes fully erased segments. In some embodiments, by assigning the erased segment to programmable pool 321, the processing logic is signifying that the segment can be programmed.

To perform the program operation, the local media controller causes an erased segment to be programmed at operation 340. In some embodiments, processing logic can select the erased segment to be programmed from programmable pool 321. In some embodiments, the local media controller can program a segment whose cells have not been reset to a uniform "erase" voltage level (e.g., an erase voltage or erase state). In some embodiments, there can be no delay between removing the segment from the programmable pool and programming the segment. In some embodiments, a delay in programming a newly erased segment might be unintentional.

Figure 4:
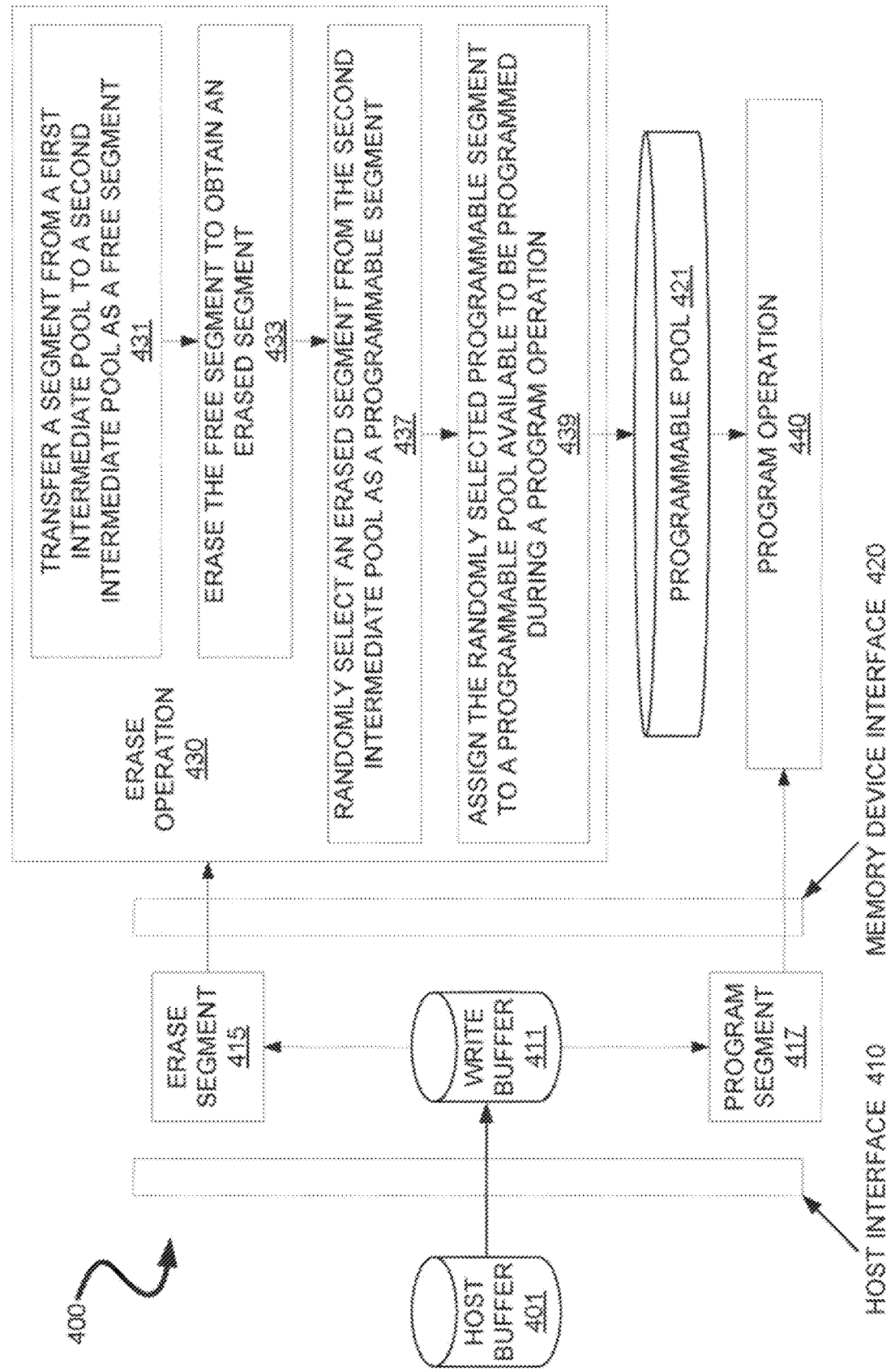
FIG. 4 illustrates a diagram of an example system for implementing one non-zero-delay erase policy, in accordance with some embodiments of the present disclosure.

FIG. 4 illustrates an example system 400 implementing a non-zero-delay erase policy (e.g., where a delay follows an erase operation before a subsequent programming operation, such as a JiT erase policy). In many embodiments, system 400 can be a memory sub-system, such as memory subsystem 110 as described with respect to FIG. 1. In many embodiments, system 400 can implement a method, such as method 200 as described with respect to FIG. 2.

The system 400 includes host buffer 401 of a host system (e.g., the host system 120 of FIG. 1A) and a buffer 411 of a memory sub-system (e.g., the memory sub-system 110 of FIG. 1A.). Program buffer 411 stores program requests received from host buffer 401. A memory sub-system controller (e.g., memory sub-system controller 115 of FIGS. 1A-1B) can send, via a memory interface device 420, an erase segment command to erase the segment at operation 415. More specifically, the erase segment command can be a command to initiate or continue an erase operation 430 to erase the segment. The memory sub-system controller can send, via the memory interface device 420, a program segment command to program the segment at operation 417. More specifically, the program segment command can be a command to initiate or continue a program operation to program the segment. In some embodiments, operations 415, and 417, can be performed serially or in parallel.

A local media controller (e.g., the local media controller 135 of FIG. 1) can receive the erase segment command to perform the erase operation 430 and/or the program segment command to perform the program operation 440. To perform the erase operation 430, the local media controller can select the segment to erase. To perform the program operation 440, the local media controller can select the segment to program. In many embodiments, the erase operation 430 can prepare the segment to be programmed with new data during the program operation 440.

Erase operation 430 can include sub-operations, such as sub-operations 431, 433, 437, and 439 shown here. At sub-operation 431, the local media controller transfers the segment from a first intermediate pool to a second intermediate pool as a free segment. In some embodiments, the first intermediate pool can be a garbage pool. The assignment of the segment to the garbage pool can indicate that the segment can be programmed. In some embodiments, the second intermediate pool can be a free pool. The assignment of the segment to the free pool can indicate that the segment can be programmed. In some embodiments, assigning the segment to the first intermediate pool can include reassigning the segment from the garbage pool to another intermediate pool. In some embodiments, the local media controller can assign a segment to two or more intermediate pools before the segment can be programmed.

At sub-operation 433, processing logic erases the segment in the second intermediate pool to obtain an erased segment. In some embodiments, the segment can be erased by setting the cells in the segment to an erase voltage level or set of erase voltage levels. In some embodiments, the local media controller can assign an erase voltage as a "high" voltage for the cells in the segment. In some embodiments, the local media controller can erase a segment by assigning the segment to an intermediate pool (e.g., the first intermediate pool of 431 or the second intermediate pool of 431, etc.).

At sub-operation 437, the local media controller randomly selects a segment from the second intermediate pool as a programmable segment. In some embodiments, processing logic might not track the amount of time a segment has been in an intermediate pool (e.g., the first and/or second intermediate pools of sub-operations 433 and 437). In some embodiments, by selecting a segment from an intermediate pool (e.g., the free pool of sub-operations 433 and 437), the processing logic is indicating that the segment can be programmed.

At sub-operation 439, the local media controller assigns the randomly selected programmable segment to a programmable pool available to be programmed during a program operation. In some embodiments, the programmable pool can be programmable pool 421. In some embodiments, the local media controller can assign erased segments to programmable pool 421. In some embodiments, programmable pool 421 can include fully erased segments. In some embodiments, by assigning the erased segment to programmable pool 421, the processing logic is indicating that the segment can be programmed.

To perform the program operation, the local media controller causes an erased segment to be programmed at operation 440. In some embodiments, processing logic can select the erased segment to be programmed from programmable pool 421. In some embodiments, processing logic can select the programmable segment from programmable pool 421 to be programmed. In some embodiments, the local media controller can program a segment whose cells have not been reset to a uniform erase voltage level (e.g., an erase voltage or erase state). In some embodiments, there can be a delay between removing the segment from the programmable pool and programming the segment. In some embodiments, processing logic can apply a delay before programming the segment from programmable pool 421.

Figure 5:
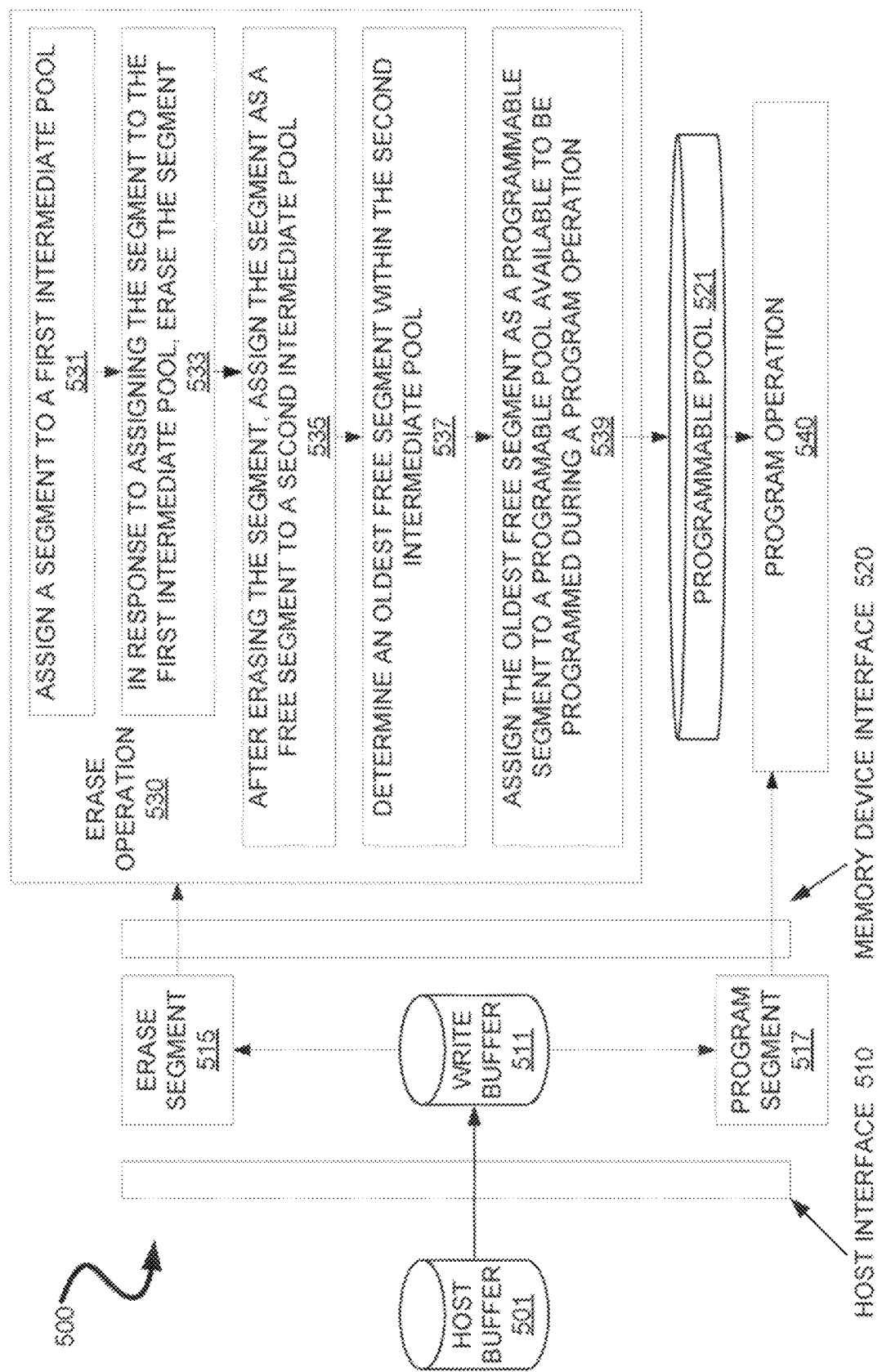
FIG. 5 illustrates a diagram of an example system for implementing another non-zero-delay erase policy, in accordance with some embodiments of the present disclosure.

FIG. 5 illustrates an example system 500 implementing a non-zero-delay erase policy (e.g., where a delay follows an erase operation before a subsequent programming operation, such as an EIA erase policy). In many embodiments, system 500 can be a memory subsystem such as memory sub-system 110 as described with respect to FIG. 1. In many embodiments, system 500 can implement a method, such as method 200 as described with respect to FIG. 2.

The system 500 includes host buffer 501 of a host system (e.g., the host system 120 of FIG. 1A) and a buffer 411 of a memory sub-system (e.g., the memory sub-system 110 of FIG. 1A.). Program buffer 511 stores program requests received from host buffer 501. A memory sub-system controller (e.g., memory sub-system controller 115 of FIGS. 1A-1B) can send, via a memory interface device 520, an erase segment command to erase the segment at operation 515. More specifically, the erase segment command can be a command to initiate or continue an erase operation 530 to erase the segment. The memory sub-system controller can send, via the memory interface device 420, a program segment command to program the segment at operation 517. More specifically, the program segment command can be a command to initiate or continue a program operation to program the segment. In some embodiments, operations 515, and 517, can be performed serially or in parallel.

A local media controller (e.g., the local media controller 135 of FIGS. 1A-1B) can receive the erase segment command to perform the erase operation 530 and/or the program segment command to perform the program operation 540. To perform the erase operation 530, the local media controller can select the segment to erase. To perform the program operation 540, the local media controller can select the segment to program. In some embodiments, the erase operation 530 can prepare the segment to be programmed with new data during the program operation 440.

Erase operation 530 can include sub-operations, such as sub-operations 531, 533, 537, and 539 shown here. At sub-operation 531, the local media controller assigns the segment to a first intermediate pool. In some embodiments, the first intermediate pool can be a garbage pool. The assignment of the segment to the garbage pool can indicate that the segment can be programmed. In some embodiments, assigning the segment to the first intermediate pool can include reassigning the segment from the garbage pool to another intermediate pool. In some embodiments, the local media controller can assign a segment to two or more intermediate pools before the segment can be programmed.

At sub-operation 533, in response to assigning the segment to the first intermediate pool, processing logic erases the segment to obtain an erased segment. In some embodiments, the segment can be erased by setting the cells in the segment to an erase voltage level or set of erase voltage levels. In some embodiments, the local media controller can assign an erase voltage as a "high" voltage for the cells in the segment. In some embodiments, the local media controller can erase a segment by assigning the segment to an intermediate pool (e.g., the first intermediate pool of 531, etc.).

At sub-operation 535, after erasing the segment, the local media controller assigns the segment as a free segment to a second intermediate pool. In some embodiments, the second intermediate pool can be a free pool. The assignment of the segment to the free pool can indicate that the segment can be programmed. In some embodiments, assigning the segment to the second intermediate pool can include reassigning the segment from the free pool to another intermediate pool. In some embodiments, assignment as a free segment can indicate the segment can be programmed.

At sub-operation 537, processing logic determines an oldest segment in the second intermediate pool. In some embodiments, processing logic can determine an oldest segment in a free pool. In some embodiments, by selecting a segment from an intermediate pool (e.g., the garbage pool of sub-operation 531, or the free pool of sub-operations 535), the processing logic is indicating that the segment can be programmed.

At sub-operation 539, the local media controller assigns the oldest free segment as a programmable segment to a programmable pool available to be programmed during a program operation. In some embodiments, the programmable pool can be programmable pool 521. In some embodiments, the local media controller can assign erased segments to programmable pool 521 in order (e.g., first-in-first-out (FIFO)). In some embodiments, programmable pool 521 can include fully erased segments. In some embodiments, by assigning the oldest free segment to programmable pool 521, the processing logic is indicating that the segment can be programmed.

To perform the program operation, the local media controller causes an erased segment to be programmed at operation 540. In some embodiments, processing logic can select the erased segment to be programmed from programmable pool 421. In some embodiments, processing logic can select the programmable segment from programmable pool 521 to be programmed. In some embodiments, the local media controller can program a segment whose cells have not been reset to a uniform erase voltage level (e.g., an erase voltage or erase state). In some embodiments, there can be a delay between removing the segment from the programmable pool and programming the segment. In some embodiments, processing logic can apply a delay before programming the segment from programmable pool 521.

Figure 6:
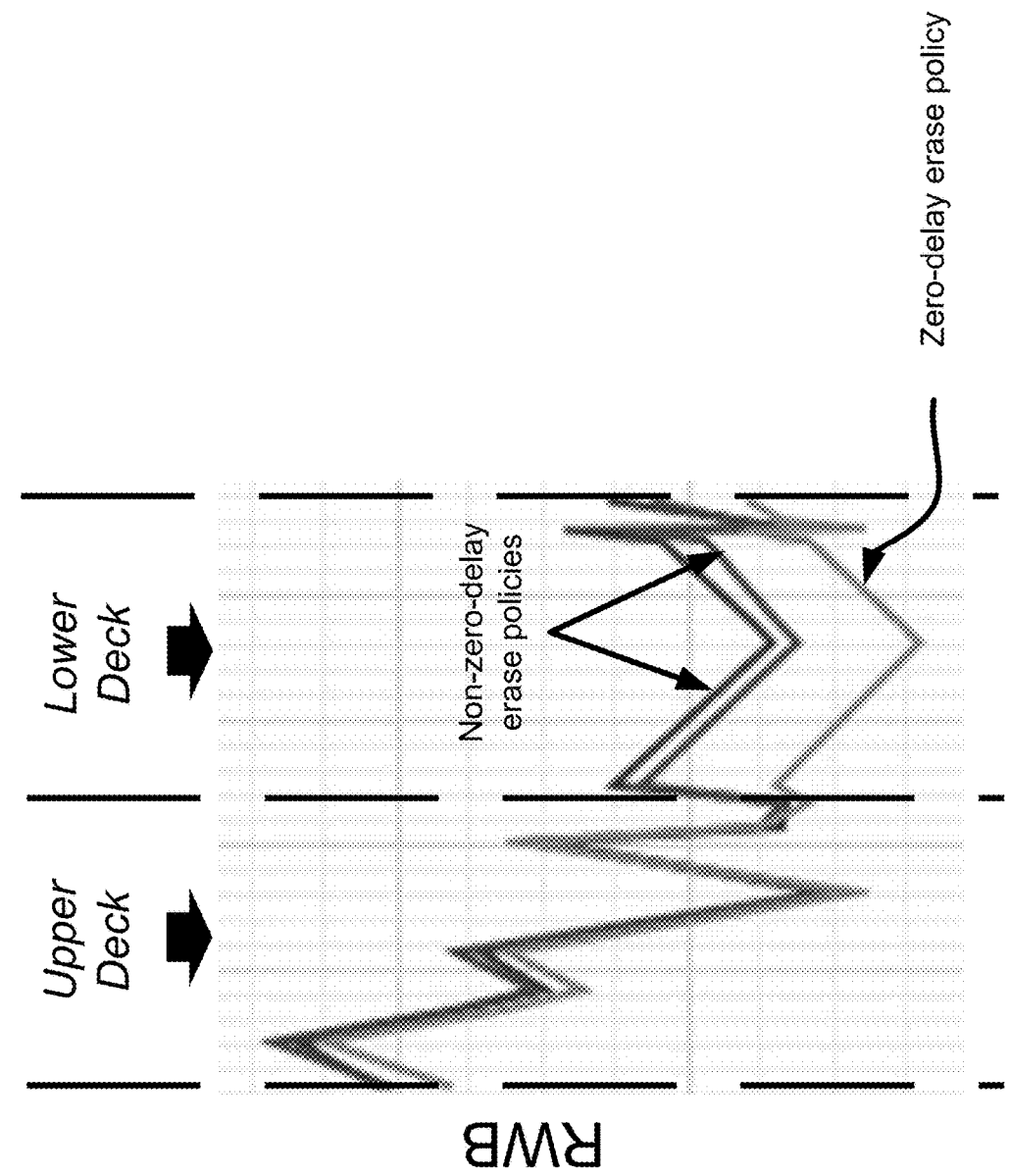
FIG. 6 illustrates an example of applying different erase policies, in accordance with some embodiments of the present disclosure.

FIG. 6 illustrates an example of applying different erase policies that results in better reliability. As shown in FIG. 6, the left part of the diagram corresponds to an upper deck, and the right part of the diagram corresponds to a lower deck, where the read window budget (RWB) in the upper deck is generally higher than the RWB in the lower deck. To improve the RWB in the lower deck, the controller can select a different erase policy. For example, the controller can change the erase policy from the zero-delay erase policy to one of the non-zero-delay erase policies. Because the non-zero-delay erase policy provides an increased erase retention time compared with the zero-delay erase policy, and the RWB generally increases with the increased erase retention time, the changed erase policy would result in the increased RWB as shown in FIG. 6.

In some implementations, when a controller receive a request to assign an erase policy to different portions of the memory device, the controller can determine whether the erase policy is a zero-delay erase policy or a non-zero-delay erase policy. Responsive to determining that the erase policy is a zero-delay erase policy, the controller can assign the erase policy to a portion of the memory device that corresponds to a RWB above a threshold value. Responsive to determining that the erase policy is a non-zero-delay erase policy, the controller can assign the erase policy to a portion of the memory device that corresponds to a RWB below a threshold value.

Figure 7:
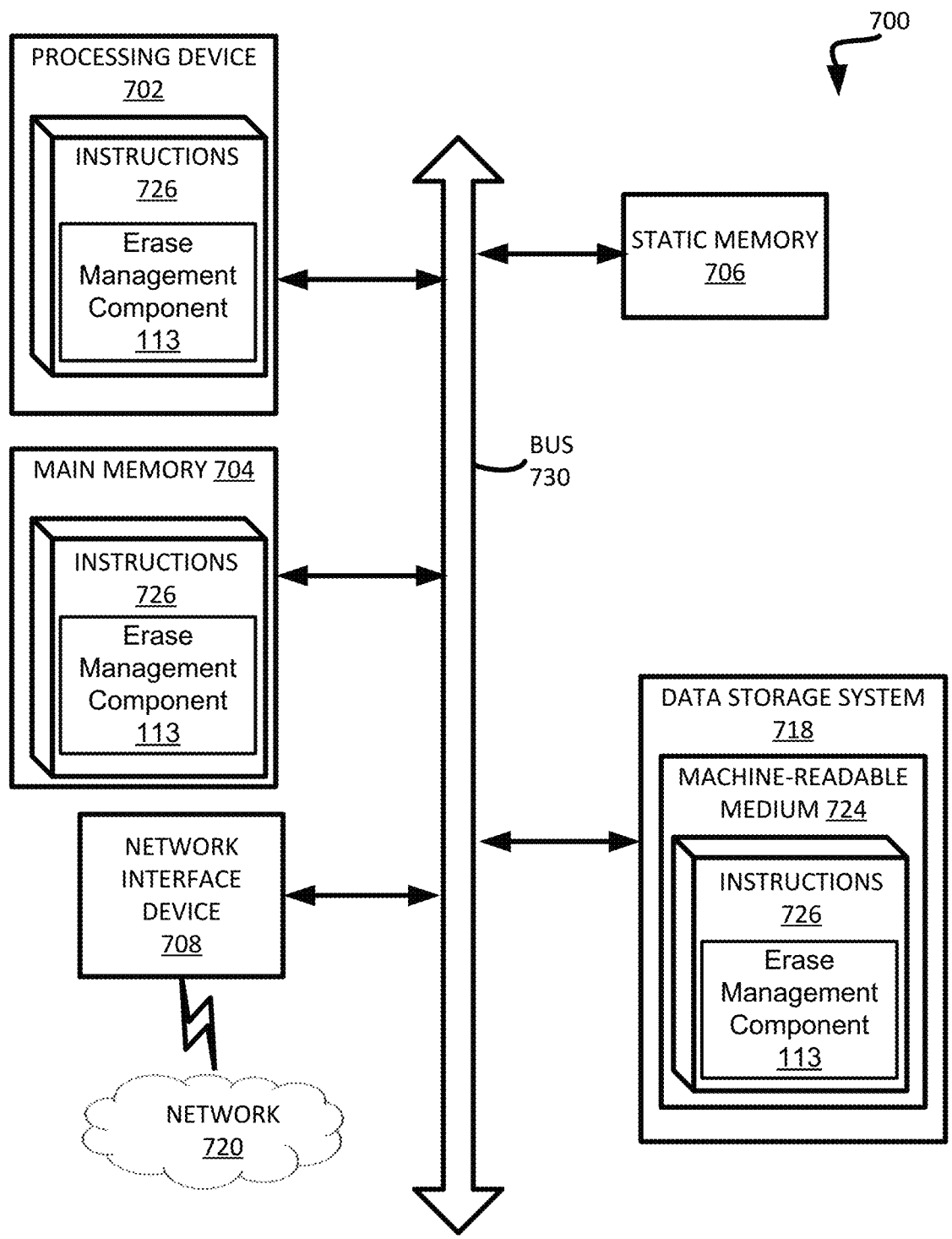
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the erase management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a component (e.g., Erase management component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
identifying a block of the memory device, the block spanning over a plurality of decks;
determining whether a set of memory cells of the memory device is disposed in a first deck of the block or a second deck of the block, the first deck having a memory reliability metric satisfying a first criterion pertaining to a reliability of a deck, and the second deck having a memory reliability metric not satisfying the first criterion;
selecting, based on the determination, an erase policy for performing an erase operation with respect to the set of memory cells; and
causing the erase operation to be performed with respect to the set of memory cells in accordance with the erase policy.

2. The system of claim 1, wherein the first criterion is satisfied responsive to a memory reliability metric being below a threshold value, and wherein selecting the erase policy further comprises:
responsive to determining that the set of memory cells of the memory device is disposed in the first deck, selecting a first erase policy; and
responsive to determining that the set of memory cells of the memory device is disposed in the second deck, selecting a second erase policy.

3. The system of claim 2, wherein the first erase policy provides an erase delay longer than that of the second erase policy.

4. The system of claim 2, wherein the first erase policy comprises at least one of a just-in-time (JiT) erase policy or an erase in advance (EIA) erase policy, and wherein the second erase policy comprises an erase on demand (EOD) erase policy.

5. The system of claim 1, wherein determining whether the set of memory cells of the memory device is disposed in the first deck of the block or the second deck of the block further comprises:
identifying the first deck or the second deck according to a data structure, wherein the data structure comprises a plurality of records, each record of the plurality of records associating a deck identifier with a value of the memory reliability metric.

6. The system of claim 5, wherein identifying the first deck or the second deck further comprises:
responsive to determining that the value of the memory reliability metric associated with a first deck identifier is below a threshold value, identifying a deck corresponding to the first deck identifier as the first deck; or
responsive to determining that the value of the memory reliability metric associated with a second deck identifier is not below the threshold value, identifying a deck corresponding to the second deck identifier as the second deck.

7. The system of claim 5, wherein the value of the memory reliability metric is determined through a characterization measurement on a deck referenced by the deck identifier.

8. The system of claim 1, wherein the plurality of decks comprise at least two independent decks, wherein each independent deck is independently accessible for a memory access operation.

9. The system of claim 8, wherein the first deck comprises an upper deck of the at least two independent decks, and the second deck comprises a lower deck of the at least two independent decks.

10. The system of claim 1, wherein the plurality of decks comprise at least one defective deck and at least one functional deck, wherein the at least one functional deck satisfies a second criterion pertaining to a functionality of a deck, and the at least one defective deck of the plurality of decks does not satisfy the second criterion.

11. The system of claim 10, wherein the at least one defective deck is physically disposed below the at least one functional deck, and the first deck comprises the at least one functional deck.

12. The system of claim 10, wherein the at least one defective deck is not physically disposed below the at least one functional deck, and the second deck comprises the at least one functional deck.

13. A method comprising:
  identifying, by a processing device, a block of a memory device, the block spanning over a plurality of decks;
  determining whether a set of memory cells of the memory device is disposed in a first deck of the block or a second deck of the block, the first deck having a memory reliability metric satisfying a first criterion pertaining to a reliability of a deck, and the second deck having a memory reliability metric not satisfying the first criterion;
  selecting, based on the determination, an erase policy for performing an erase operation with respect to the set of memory cells; and
  causing the erase operation to be performed with respect to the set of memory cells in accordance with the erase policy.

14. The method of claim 13, wherein the first criterion is satisfied responsive to a memory reliability metric being below a threshold value, and wherein selecting the erase policy further comprises:
  responsive to determining that the set of memory cells of the memory device is disposed in the first deck, selecting a first erase policy; and
  responsive to determining that the set of memory cells of the memory device is disposed in the second deck, selecting a second erase policy.

15. The method of claim 14, wherein the first erase policy provides an erase delay longer than that of the second erase policy.

16. The method of claim 14, wherein the first erase policy comprises at least one of a just-in-time (JiT) erase policy or an erase in advance (EIA) erase policy, and wherein the second erase policy comprises an erase on demand (EOD) erase policy.

17. A non-transitory computer-readable storage medium comprising instructions that, when executed by a processing device, cause the processing device to perform operations comprising:
  identifying a block of a memory device, the block spanning over a plurality of decks;
  determining whether a set of memory cells of the memory device is disposed in a first deck of the block or a second deck of the block, the first deck having a memory reliability metric satisfying a first criterion pertaining to a reliability of a deck, and the second deck having a memory reliability metric not satisfying the first criterion;
  selecting, based on the determination, an erase policy for performing an erase operation with respect to the set of memory cells; and
  causing the erase operation to be performed with respect to the set of memory cells in accordance with the erase policy.

18. The non-transitory computer-readable storage medium of claim 17, wherein the first criterion is satisfied responsive to a memory reliability metric being below a threshold value, and wherein selecting the erase policy further comprises:
  responsive to determining that the set of memory cells of the memory device is disposed in the first deck, selecting a first erase policy; and
  responsive to determining that the set of memory cells of the memory device is disposed in the second deck, selecting a second erase policy.

19. The non-transitory computer-readable storage medium of claim 18, wherein the first erase policy provides an erase delay longer than that of the second erase policy.

20. The non-transitory computer-readable storage medium of claim 18, wherein the first erase policy comprises at least one of a just-in-time (JiT) erase policy or an erase in advance (EIA) erase policy, and wherein the second erase policy comprises an erase on demand (EOD) erase policy.

* * * * *